R. JOHNSON.
SPEED METER.
APPLICATION FILED AUG. 16, 1906.
945,327.
Patented Jan. 4, 1910.
Fig. 1.
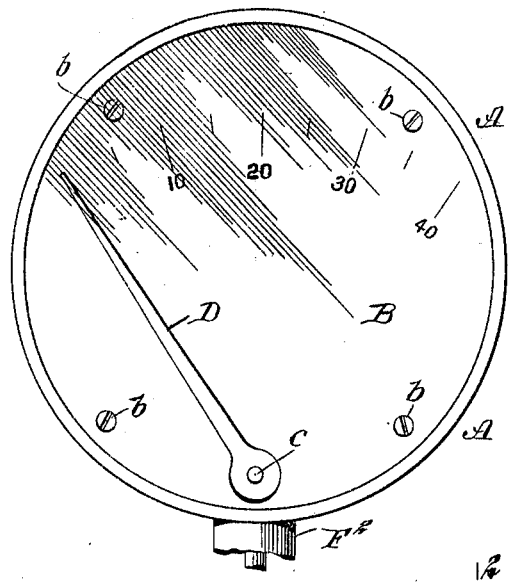
Fig. 2.
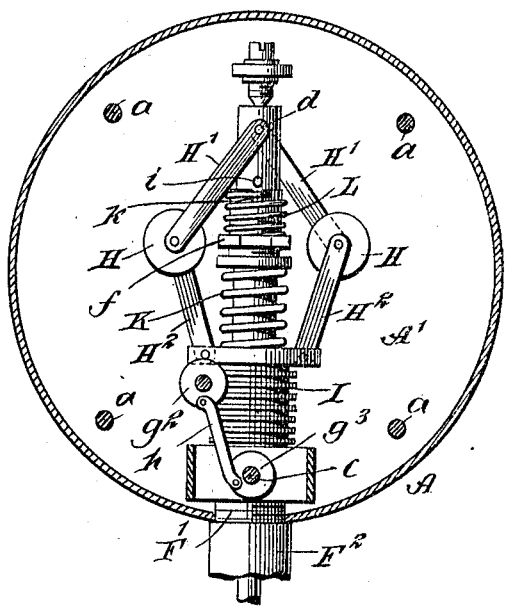
Fig. 3.
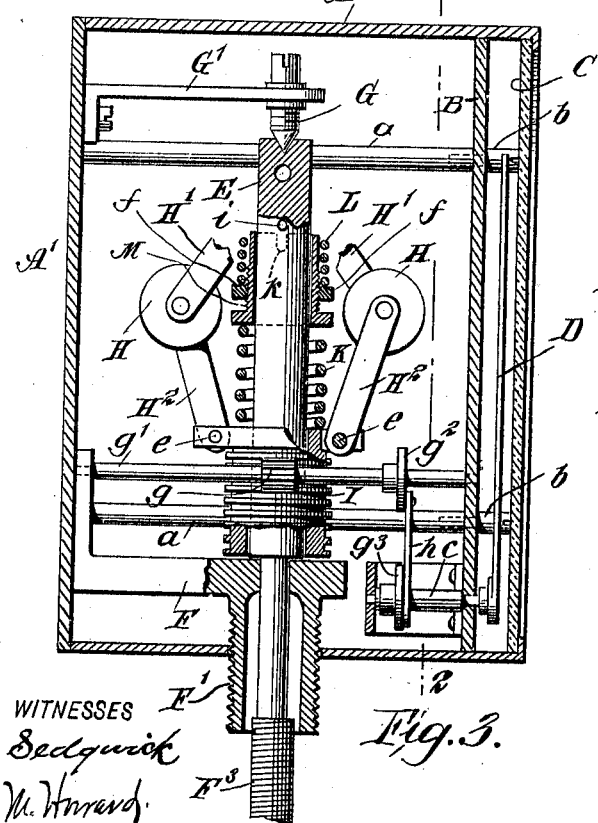
Fig. 4.
WITNESSES
C. Sedgwick
J. M. Howard
INVENTOR
Ragnar Johnson
BY Ernst Lundgren
ATTORNEY

UNITED STATES PATENT OFFICE.

RAGNAR JOHNSON, OF NEW YORK, N. Y.

SPEED-METER.

945,327.  Specification of Letters Patent.  Patented Jan. 4, 1910.

Application filed August 16, 1906. Serial No. 330,811.

*To all whom it may concern:*

Be it known that I, RAGNAR JOHNSON, a subject of the King of Sweden, residing at the borough of Brooklyn, city of New York, in the county of Kings and State of New York, have invented certain new and useful Improvements in Speed-Meters, of which the following is a full, clear, and exact description, reference being had to the accompanying drawings, and to the reference characters marked thereon.

My invention has relation to implements or devices for indicating the speed of a wheel or other part of a machine and known as speed meters or speed indicators.

While my improved device is applicable in any situation wherein a speed meter may be advantageously employed, it is especially designed for the purposes of measuring or indicating the speed of traveling vehicles, and particularly in connection with automobiles and other rapidly traveling vehicles wherein it is desirable that the speed should be measured or indicated.

The object of my invention is to provide or produce a simple, cheap, compact, efficient and reliable speed meter which shall be of few and simple parts, which shall indicate low speeds as well as high speeds, which may be easily constructed and assembled, and which will not be liable to become disarranged or otherwise to get out of order.

To accomplish the foregoing and to secure other and further advantages in the matters of construction, operation and use, my improvements involve certain new and useful arrangements or combinations of parts and peculiarities of construction as will be herein first fully described and then pointed out in the claims.

In the accompanying drawings forming part of this specification, Figure 1 is a front elevation of my improved speed meter. Fig. 2 is a vertical section and elevation on a plane through line 2—2 of Fig. 3. Fig. 3 is a view partly in section and partly in elevation on a plane through the main axis of the device. Fig. 4 is a top or plan view of the main shaft of the device showing the manner of arranging and mounting the movable weights.

In all these figures like letters of reference, wherever they occur, indicate corresponding parts.

A is a cylindrical shell of metal or other suitable material within which the working parts of the meter are mounted and arranged and whereby they are protected from dust or other substances which would interfere with their reliable operation.

B is a dial or scale plate secured in the front part of the cylinder A, and on this is displayed suitable graduations and indices, substantially as indicated in Fig. 1 and according to the circumstances or conditions under which the meter is to be used. The dial plate is fixed in position by use of rods, $a$, $a$, which may be connected with the back plate $A^1$ and by screws, as $b$, $b$, or in any other suitable, reliable manner.

In front of the dial plate and closing the otherwise open front portion of the cylinder A is a transparent protecting plate, C, which is usually made of glass and mounted in place so that it will maintain its position under all circumstances of use.

D is the finger or pointer, the same being mounted upon a shaft, as $c$, located near the wall of the cylinder and serving, through connections with the operating parts, to move the pointer, the outer end of which traverses the scale.

E is the main shaft of the meter, the same being mounted so that it may be easily, smoothly and rapidly rotated. This shaft is stepped at bottom in a bracket, F, which is secured in place upon a portion of the casing, a threaded neck $F^1$ of this bracket extending through the casing to serve as a means of mounting the meter in place in connection with a suitable support, a reduced portion of the shaft projecting down through the neck of the bracket to receive the means by which motion is communicated to the shaft from the wheel or other object the speed of which it is desired to measure or indicate.

$F^2$ represents a portion of any form of support fitted to receive the threaded neck $F^1$ and to sustain the meter.

$F^3$ represents any suitable form of connection, as a flexible tubing to be connected with the end of the shaft to transmit motion thereto. The upper end of the shaft is maintained in position by a pivot pin, G, which is sustained in a fixed bracket, $G^1$. The pivot pin is preferably threaded through the bracket and arranged to be adjusted to the proper position for work.

H, H, are weights, preferably in the form of flat disks, and these are mounted in arms connected with the shaft and with a movable collar mounted on said shaft in such manner that the rapid rotation of the shaft will compel the weights to swing out or away from the shaft and thus to draw up the movable collar. The arms $H^1$, $H^1$, are connected with the shaft as by a suitable pin, $d$; and the arms, $H^2$, $H^2$, are connected with the slidable collar, I, as at $e$, $e$, both sets of arms being hinged upon the weights.

Two resisting coiled springs of different powers are employed. The more powerful spring is represented at K and the other at L. The spring L is carried by a slidable collar, M, mounted to move vertically upon the shaft as by means of a feather (not shown) and arranged to be moved by the spring K. The position of spring L and therefore its available tension is regulated by a nut $f$ threaded upon the collar. The stop pin $i$ seated in the shaft limits the upward travel of spring L.

The collar I is provided with parallel bands and grooves which encircle it and which constitute the teeth by which the engaging pinion is made to rotate as the collar is moved up and down upon the shaft. The engaging pinion is represented at $g$, the same being mounted at the proper point on a rotatable shaft, $g^1$, which carries a crank disk, as $g^2$. The shaft $c$ is also supplied with a crank disk, as at $g^3$, and these two cranks are connected by a suitable link, as $h$.

When the device thus constructed and arranged is in operation, a moderate movement or speed of the main shaft will cause the weights H to swing outward and draw up the collar I which in turn will cause the spring K to elevate the collar M which carries the spring L against the stop pin, $i$. A slot, as at $k$, in the top of the collar M permits the collar to ride up a short distance past the pin $i$. As soon as the bottom of this slot touches the pin, the further upward movement of the collar is arrested, and then, if the speed be increased, the larger spring K is compressed and its power of resistance is opposed to the further outward movement of the centrifugally acting weights.

The up and down movements of the collar I cause the shaft $g^1$ to rotate in one direction or the other, and through the connections above referred to, cause the pointer D to move upon the scale. The position of the pointer in respect to the scale at any time indicates the speed of the main shaft and therefore the speed of the object with which the main shaft is connected and from which it is driven.

The employment of the adjustable nut $f$ upon the threaded collar M which rests on the stronger spring K and which carries the spring L of lesser power than spring K, provides means for regulating the position of spring L.

Having now fully described my invention, what I claim as new herein and desire to secure by Letters Patent, is:—

1. In a speed meter the combination of a shaft, a collar movable on said shaft, a spring resting on said collar, a second collar surrounding said shaft and resting on said spring, a second spring supported by said second collar, means on the shaft to limit the upward movement of said second collar and means for adjusting the position of the second spring on said collar.

2. In a speed meter the combination of a shaft, a collar movable on said shaft, a spring resting on said collar, a second collar surrounding said shaft and resting on said spring, a second spring supported by said second collar, means on the shaft to limit the upward movement of said second collar and an adjustable nut on said second collar bearing against said second spring.

3. In a speed meter the combination of the main shaft, springs of different powers, a collar slidable upon the shaft, arms pivotally connected with said collar on said shaft, weights mounted on said arms and arranged to compress the springs by movement of said collar, a second collar surrounding the shaft resting upon the spring of greater power and bearing the spring of lesser power, and a nut adjustable upon said second collar substantially as and for the purpose set forth.

4. In a speed meter the combination of the main shaft, springs of different powers, a collar slidable upon the shaft, arms pivotally connected with said shaft and said collar, weights mounted on said arms and arranged to compress the springs by movement of said collar, a second collar surrounding the shaft resting on the spring of greater power and bearing the spring of lesser power, means on said shaft for limiting the movement of said second collar, and a nut adjustable upon said second collar, substantially as and for the purpose set forth.

In testimony whereof, I have signed my name to this specification in the presence of two subscribing witnesses.

RAGNAR JOHNSON.

Witnesses:
   C. SEDGWICK,
   J. M. HOWARD.